(12) United States Patent
Kupryjanow et al.

(10) Patent No.: US 12,243,545 B2
(45) Date of Patent: Mar. 4, 2025

(54) METHOD AND SYSTEM OF NEURAL NETWORK DYNAMIC NOISE SUPPRESSION FOR AUDIO PROCESSING

(71) Applicant: Intel Corporation, Santa Clara, CA (US)

(72) Inventors: Adam Kupryjanow, Gdansk (PL); Lukasz Pindor, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 510 days.

(21) Appl. No.: 17/561,848

(22) Filed: Dec. 24, 2021

(65) Prior Publication Data

US 2022/0124433 A1    Apr. 21, 2022

Related U.S. Application Data

(60) Provisional application No. 63/252,687, filed on Oct. 6, 2021.

(51) Int. Cl.
| | |
|---|---|
| H03G 5/00 | (2006.01) |
| G06N 3/08 | (2023.01) |
| G10L 21/0208 | (2013.01) |
| G10L 21/0232 | (2013.01) |
| G10L 25/30 | (2013.01) |
| G10L 25/78 | (2013.01) |
| H04R 3/04 | (2006.01) |

(52) U.S. Cl.
CPC ............ *G10L 21/0208* (2013.01); *G06N 3/08* (2013.01); *G10L 21/0232* (2013.01); *G10L 25/30* (2013.01); *G10L 25/78* (2013.01); *H04R 3/04* (2013.01)

(58) Field of Classification Search
CPC . G10L 21/0208; G10L 21/2032; G10L 25/30; G10L 25/78; G06N 3/08
See application file for complete search history.

(56) References Cited

U.S. PATENT DOCUMENTS

| | | | |
|---|---|---|---|
| 11,646,009 B1 * | 5/2023 | Chhetri | G10L 15/16 704/232 |
| 2021/0012767 A1 | 1/2021 | Kupryjanow et al. | |
| 2022/0084535 A1 | 3/2022 | Kupryjanow et al. | |
| 2023/0116052 A1 * | 4/2023 | Eskimez | G10L 15/20 704/223 |
| 2023/0306981 A1 * | 9/2023 | Zheng | G10L 25/30 |
| 2024/0021210 A1 * | 1/2024 | Biswas | G10L 21/0208 |

OTHER PUBLICATIONS

Defossez, A., et al., "Demucs: Deep Extractor for Music Sources with extra unlabeled data remixed" , arXiv:1909.01174 (2019).
Luo, Y., et al., "Conv-TasNet: Surpassing Ideal Time-Frequency Magnitude Masking for Speech Separation" , IEEE/ACM Transactions on Audio, Speech, and Language Processing, vol. 27, No. 8, pp. 1256-1266, Aug. 2019.
Luo, Y., et al., "Ultra-Lightweight Speech Separation Via Group Communication" , ICASSP, 2021.

(Continued)

*Primary Examiner* — Simon King
(74) *Attorney, Agent, or Firm* — Akona IP PC

(57) ABSTRACT

A method and system of neural network dynamic noise suppression is provided for audio processing.

25 Claims, 10 Drawing Sheets

(56) References Cited

OTHER PUBLICATIONS

Mazzawi, H., et al., "Improving keyword spotting and language identification via neural architecture search at scale", Interspeech 2019, Sep. 15-19, 2019, Graz, Austria, pp. 1278-1282.

Uhlich, S., et al., "Improving Music Source Separation based on DNNs through Data Augmentation and Network Blending", IEEE International Conference on Acoustics, Speech and Signal Processing (ICASSP), IEEE, pp. 261-265 (2017).

Zeghidour, et al., "Wavesplit: End-to-End Speech Separation by Speaker Clustering", arXiv:2002.08933, (2020).

Zhang, X., et al., "Low-Delay Speech Enhancement Using Perceptually Motivated Target and Loss", Interspeech (2021).

\* cited by examiner

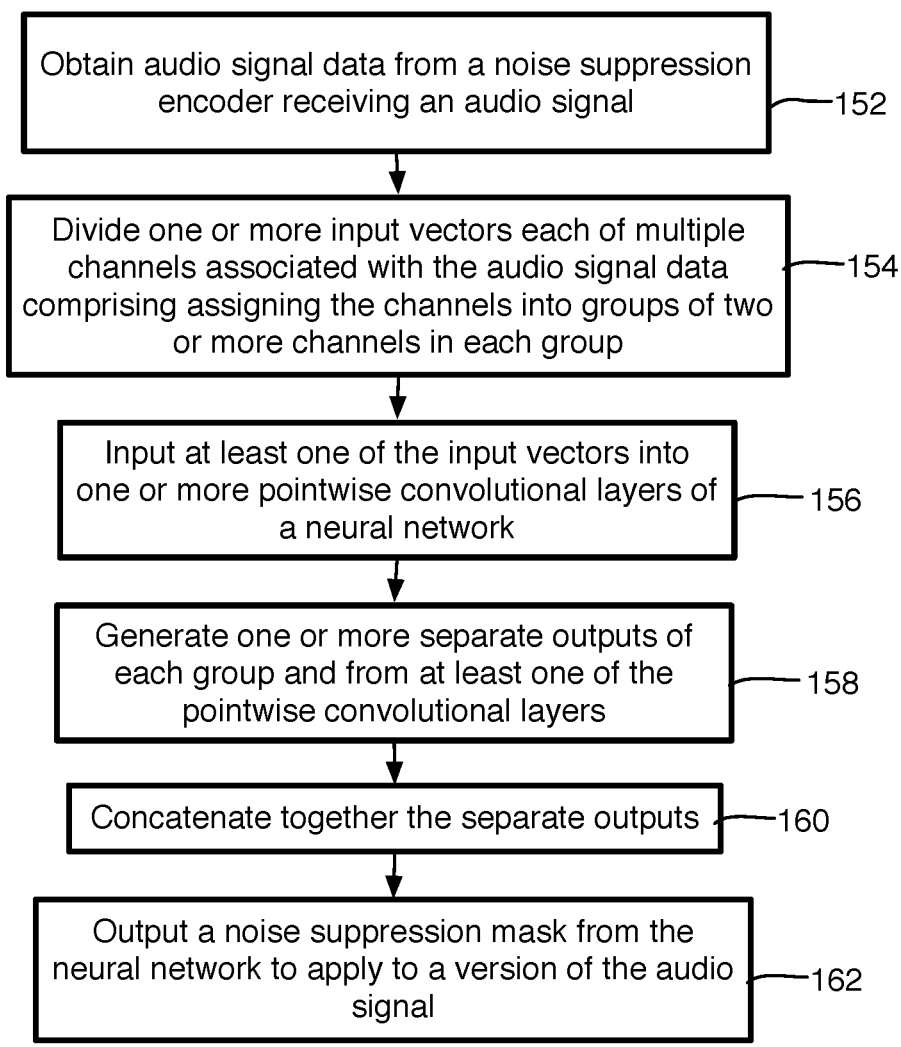

METHOD AND SYSTEM OF NEURAL NETWORK DYNAMIC NOISE SUPPRESSION FOR AUDIO PROCESSING

CLAIM FOR PRIORITY

This application claims the benefit of priority to U.S. Provisional Patent Application No. 63/252,687, filed on Oct. 6, 2021, titled "METHOD AND SYSTEM OF NEURAL NETWORK DYNAMIC NOISE SUPPRESSION FOR AUDIO PROCESSING", and which is incorporated herein by reference in its entirety for all purposes.

BACKGROUND

Many audio or listening applications, such as a personal assistant application on a smartphone for example, use noise reduction to obtain a cleaner audio signal. Many conventional audio noise reduction systems use neural networks that detect the noise and create a mask that is an estimate of the noise to be used to remove or reduce the noise in the audio signal. For example, one such noise reduction technique is dynamic noise suppression (DNS) that uses a noise reduction model that can efficiently and effectively remove a large variety of different noises, whether a baby crying, a dog barking, airplane engines, and so forth. These conventional systems, however, typically use a very large number of neural network parameters (or in other words, the neural network weights), and in turn, occupy a relatively large amount of random access memory (RAM) while operating. When large memory capacity is needed, these conventional noise reduction systems cannot operate on small computing devices with small memories and low power capacities while still providing high quality audio, such as on smartphones.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1B is a flow chart of another example method of dynamic noise suppression for audio processing according to at least one of the implementations herein;

DETAILED DESCRIPTION

Figure 1A:
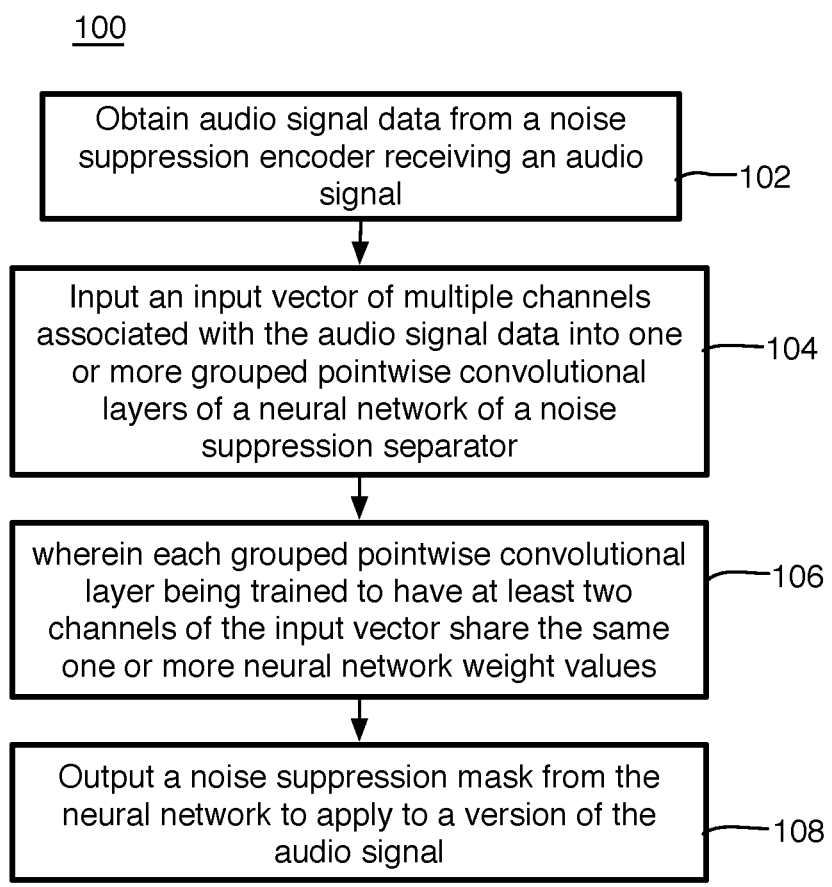
FIG. 1A is a flow chart of an example method of dynamic noise suppression for audio processing according to at least one of the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as computing systems that have or receive acoustic signals from one or more microphones, but also may include laptop or desktop computers, tablets, mobile devices such as smart phones, smart speakers, smart watches, and/or smart headphones or head mounted displays (HMDs), internet of things (IoT) devices, video game panels or consoles, virtual, augmented, or mixed reality systems, high or low definition audio systems, surround sound or neural surround home theatres, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of neural network dynamic noise suppression for audio processing are described herein.

A number of known techniques attempt to reduce the high computational load and power consumption of neural network noise reduction operations being applied to audio data that needs to be cleaned for further use. Some of these techniques include quantization convert 32 bit floating point values to 16 or 8 bit integers to shrink the models by a factor of two to four, or distillation techniques that use a smaller model to train using the knowledge of a larger main model. Other known noise reduction methods use factorization of neural network components to replace regular convolutional neural networks with smaller depth-wise convolutional neural networks that take less memory capacity to store. Conventional network architecture or parameters also may be adjusted to improve the noise reduction capability of the model by performing neural architecture search (NAS) techniques used to design a neural network, based partly on reinforcement learning and other network structure searching techniques. See Mazzawi, H., et al., "Improving keyword spotting and language identification via neural architecture search at scale", Proc. Interspeech, pp. 1278-1282 (2019).

Any of these conventional techniques can be used together and extended by network element grouping to reduce model size, except additional layers and modules are needed to run the network. See Luo, Y. et al., "Ultra-Lightweight Speech Separation Via Group Communication", ICASSP (2021). In this case, training a noise reduction model network when using such a known element grouping technique such as this is still complicated by adding these extra layers to handle separated groups in parallel. This in turn results in training procedures that become too slow to use on large batch sizes.

Whether or not grouping is used, these conventional techniques use very large noise reduction models that require large amounts of memory. To attempt to solve this issue, down-scaling may be applied by using convolution filters with certain sizes for example to reduce the size of the noise reduction model. The down-scaling, however, does not linearly correlate with resulting increases in sound quality. Thus, the down-scaling of the noise reduction model requires an excessive amount of experimentation to achieve a desired sound quality with a target noise reduction model size.

Also, the known techniques do not use auxiliary information usually available from audio systems that can give certain deterministic information and guide a rate control (RC) algorithm without (or with minimum) additional computing and memory cost. Also, the known systems do not fully utilize modern graphics processing units (GPUs) for audio and that can handle media, graphics, and artificial intelligence (AI) compute capability. For example, efficient GPUs can handle a much higher load than once every 10 ms for a limited number of audio processing tasks, and in some cases an available GPU is not used at all during audio processing.

To resolve these issues, the present method and system achieves DNS model size down-scaling by using one or more grouping techniques at pointwise convolutional layers. Specifically, a DNS has an encoder, a separator, and a decoder. The encoder receives the audio signals and converts the audio signals into features (or input vectors or input encoder kernels) in a form that can be used as input into a neural network at the separator. By one approach, the encoder kernel may be in the form of 1×1×F. When the DNS system uses the frequency domain, the encoder kernel may be a frequency domain magnitude spectrum, and F may be the number of frequency bins where each bin provides a feature of the encoder kernel. Thereafter, the neural network of the separator has a number of pointwise convolutional layers and other layers described below. The pointwise convolutional layers receive input vectors that are at least indirectly based on the encoder kernels, and in turn frequency bins, from the encoder. The output from the separator is a noise suppression mask that is an estimate of the noise. The noise suppression mask is then applied to the original audio signal, or other version of the audio signal, such as the magnitude spectrum, to remove noise, and then a decoder inverts and outputs a cleaner version of the audio signal.

Two different grouping techniques can be used herein to reduce the number of network parameters, and in turn the size of the neural network (or noise reduction model). One grouping technique is referred to as weight sharing with weight sharing groups. The weights are the neural network parameters. The input vectors to a layer each may have multiple channels, which in turn each may have multiple features (or inputs). In this case, the DNS neural network is trained so that at least two channels of the input vector to a 1×1 pointwise convolutional layer receives the same weight values, thereby establishing a weight sharing group. A single input vector may form multiple weight sharing groups, where each group has two or more channels from the input vector, which reduces the number of parameters (or weight values) that need to be stored, and in turn reduce the size of the model. The more weight sharing groups are used, or the more channels in a single weight sharing group, the lower the number of parameters. It should be noted that stating the input vector has or forms the weight sharing groups, or has inputs divided into weight sharing groups, actually refers to the input vector's correspondence to the convolutional kernel or filter that has the shared weights (or coefficients). The input vector typically has feature values that will be multiplied by, or otherwise modified by, the corresponding weights of the convolutional kernel (or filter).

By another grouping technique, the separator neural network divides an input vector that is to be input into a pointwise convolutional layer by assigning two or more channels to each input group. By one approach, the division is a representation or effect where the input vector is not actually divided into the groups for input to a pointwise convolutional layer group by group. The entire single input vector still may be input to a layer as one entity. In this case, however, the group assignments are provided to the pointwise convolutional layer (PCL), and the convolutional filters at the PCL are assigned to certain groups by being assigned to certain input nodes for example. This maintains the processing (or propagation through the PCL) of each group separate from the other groups so that each group has its own output (or outputs) from the PCL. The resulting outputs of all or multiple groups at the PCL from the same input vector are then concatenated to form a single input vector for a next layer or operation. This reduces the number of parameters used by the neural network due to the reduction in channels (since each group is now treated as a channel). Different convolutional filter values are no longer needed for each original channel separately.

The input groups may be applied at all of the PCLs on the separator neural network or on the entire DNS system. By one form, the input groups may be applied at only PCLs in one dimensional (1-D) convolutional blocks that each have its own sequence of layers including PCLs. This may include applying the input groups to all PCLs in a 1-D convolutional block or only certain PCLs as described below. Many different variations are contemplated.

As a result, the disclosed methods maintain high quality audio processing for various model sizes. Also with this arrangement, the obtained model sizes correlate substantially linearly with subjective quality. It is believed the strong correlation is caused by using less parameters in a single layer so that a single layer has fewer options to adjust values for input vector features. Thus, with a higher number of groups, fewer input features are used to create a single output from convolution. In other words, grouping at convolutional layers results in less context in a single input. This strong correlation enables model quality prediction for different sizes without first training the models, and while reducing memory usage without significant impact on quality and model topology. The disclosed method also decreases compute complexity with reduction of model size.

Referring to FIG. 1A, an example process 100 provides a computer-implemented method of neural network dynamic noise suppression for audio processing according to at least one the implementations herein, and specifically using weight sharing groups with one or more pointwise convolutional layers. Process 100 may include one or more operations, functions or actions as illustrated by one or more of operations 102 to 108 numbered evenly. By way of non-limiting example, process 100 may be described herein with reference to example acoustic processing devices or systems of any of FIGS. 2-4B, and where relevant.

Process 100 may include "obtain audio signal data from a noise suppression encoder receiving an audio signal" 102, where one or more microphones or microphone arrays may collect sound. The microphones are not particularly limited as to type as long as analog or digital audio signals can be obtained from the microphones. The data from the microphone then may be pre-processed at least sufficiently for DNS operations as described below.

This operation also may involve the use of an encoder that receives windows or frames of an audio signal, and may use short-time Fourier transform (STFT) to provide a frequency domain magnitude spectrum and a phase spectrum. Each frequency bin of the STFT may be treated as a separate channel. By one approach, the magnitude spectrum is provided as an encoder kernel (or first input vector) of 1×1× (number of available frequency bins) for input to a neural network separator forming a denoising model.

Process 100 may include "input an input vector of multiple channels associated with the audio signal data into one or more grouped pointwise convolutional layers of a neural network of a noise suppression separator" 104. Specifically, the separator may comprise a temporal convolutional neural network (TCN or just separator neural network) to separate speech from dynamic noise through the application of a separation mask. The mask is generated by inputting the magnitude spectrum through a number of stacks of 1-D dilated convolutional blocks as well as other layers described below that have one or more pointwise convolutional layers. Each or individual 1-D convolutional block may have an initial convolutional pointwise (kernel size 1) (PCL) layer, and branching output convolutional pointwise (kernel size 1) layer and a skip-connection convolutional pointwise (kernel size 1) layer, where the pointwise layers may be terminating layers for the 1-D convolutional blocks, but could be other layer positions. The separator neural network also may have one or more bottleneck and/or spreader PCLs. The input vector refers to the input obtained as output from a previous layer (or from the encoder) and input to one of the PCLs.

Process 100 may include "wherein each grouped pointwise convolutional layer being trained to have at least two channels of the input vector share the same one or more neural network weight values" 106. This involves grouping channels of an input vector so that the same weights are applied to multiple channels of the same group. The input vector may have at least two weight sharing groups in order to reduce the noise reduction model size. By one form, an input vector may be divided into 2 to 32 weight sharing groups, and each single weight sharing group may have multiple channels. So, for example, when an input vector has 128 channels and two weight sharing groups are used, each group has 64 channels. This lowers the number of weights to be stored in memory to control the noise reduction model size as explained below. The same number of groups may be used for each grouped PCL, or alternatively, individual PCLs could have different numbers of groups. Also the PCL may have the same number of channels in each group or the number of channels in a group may vary.

Also as mentioned, this operation refers to training the separator neural network to share weights among input slots or registers (or nodes) of neural network circuitry such as a multiply accumulate circuit, for example, that performs the neural network computations. The weights actually may be entered into the circuit separately from the input features that are each placed in an input node. The weights are used in a convolutional kernel or filter to be multiplied by the input values in the input vector. Thus, the weights align with, or correspond to the positions of, inputs (or features that form the channels) in the input vector, so that it can be stated that the input vector has or forms groups of shared weights by having those weights multiplied by (or otherwise applied to) the feature values of the channels. By one form, each weight sharing group is formed of inputs (or features) that are consecutive in the input vector and that are respectively modified by the weights in the convolutional filter or kernel.

Also, for this operation, only those PCLs with weight sharing groups are referred to as grouped pointwise convolutional layers. In regard to this, the weight sharing groups may be used at all PCLs of the separator neural network or on the entire DSN system, or the PCLs may be used on at least one or all 1-D convolutional blocks. Within the individual 1-D convolutional blocks, the weight sharing groups may be used on at least one PCL, all PCLs, just a first encountered PCL, just one or both of the output and skip-connection branch PCLs, and/or after, or only after, a depth-wise convolutional layer in the 1-D convolutional block. Many variations are contemplated. The more PCLs use the weight sharing, the smaller the model will be because weight sharing reduces the number of parameters that need to be stored in memory.

Process 100 may include "output a noise suppression mask from the neural network to apply to a version of the audio signal" 108, and by using the separator. As mentioned, the separator neural network receives the magnitude spectrum and estimates a weighting function, i.e., the noise suppression mask, for the magnitude spectrum. Thereafter, the mask may be applied to the magnitude spectrum to clean the noise, and the cleaned audio signals may be decoded, where inverse STFT may be used for the modified (de-noised) magnitude spectrum and phase spectrum to reconstruct the audio signals when the frequency domain is being used, for example.

Referring to FIG. 1B, an example process 150 provides a computer-implemented method of neural network dynamic noise suppression for audio processing according to at least one the implementations herein, and specifically using input groups with one or more pointwise convolutional layers. Process 150 may include one or more operations, functions or actions as illustrated by one or more of operations 152 to 162 numbered evenly. By way of non-limiting example, process 150 may be described herein with reference to example acoustic processing devices or systems of any of FIGS. 2-4B, and where relevant.

Process 100 may include "obtain audio signal data from a noise suppression encoder receiving an audio signal" 152, and this operation is similar to operation 102 above for the weight sharing groups. So here too, a first input vector from the encoder may or may not include or represent frequency bins, and subsequent input vectors to PCL layers are therefore associated with the audio signal data of the first input vector, which may be frequency bins when the encoder is providing frequency domain data.

Process 150 may include "divide one or more input vectors each of multiple channels associated with the audio signal data comprising assigning the channels into groups of two or more channels in each group" 154, and here, a divider assigns channels of the input vector into input groups. By one form, a single input group may have many channels where the total number of channels in the input vector (here usually 128, 256, or 512) is divided by the number of groups to get channels per group. By one form, all groups have the same number of channels, although the number could be different, and each PCL could have a different number of groups in an input vector, depending on the position of the PCL in the network for example. By some methods, a single input vector may have 64 to 2048 features (or inputs divided into the channels, which in turn are divided into the input groups. The channel-to-group assignments then may be provided to the PCL.

Particularly, process 150 then may include "input at least one of the input vectors into one or more pointwise convolutional layers of a neural network" 156. Here, the input vector may be loaded into the input registers of an MAC or other fixed or general function layer processing circuit. Thus, a neural network control then reads the channel-to-group assignments and either places weights in a local or internal weight buffer according to the assignments or reads the weights from the weight buffer that correspond to the assignments. It will be understood that the group assignments for channels could be predetermined and fixed, or could be adaptable, but in either case the PCL may not have the assignment knowledge and obtains the assignment knowledge from a divider (or divider layer).

Process 150 may include "generate one or more separate outputs of each group from at least one of the pointwise convolutional layers" 158. The weights are then used by the circuitry so that groups are processed, or propagated separately from other groups so that a separate output is generated for each group. The weights are used in a convolutional filter (or kernel) to move over a group, and the weights, and in turn the filter, may be different from group to group as mentioned. Thus one set of weight may be used for each group rather than each individual original channel of the input vector, thereby reducing the number of parameters, and in turn model size.

Process 150 may include "concatenate together the separate outputs" 160, where each output (or set of outputs) of a group is then concatenated together to form a single output vector, which is an input vector for a next layer or operation.

Also, the system may use the input groups on any one, or any combination, of the PCLs and/or 1-D convolutional blocks as mentioned above with the weight sharing groups.

It also should be noted that both the weight sharing groups and the input groups may be applied on the separator at the same run-time in any combination, where the two grouping techniques may be applied to different PCLs, the same PCLs, or a combination of both on the DNS system.

Process 150 may include "output a noise suppression mask from the neural network to apply to a version of the audio signal" 162, and as already described above with operation 108 for the weight sharing groups.

Figure 2:
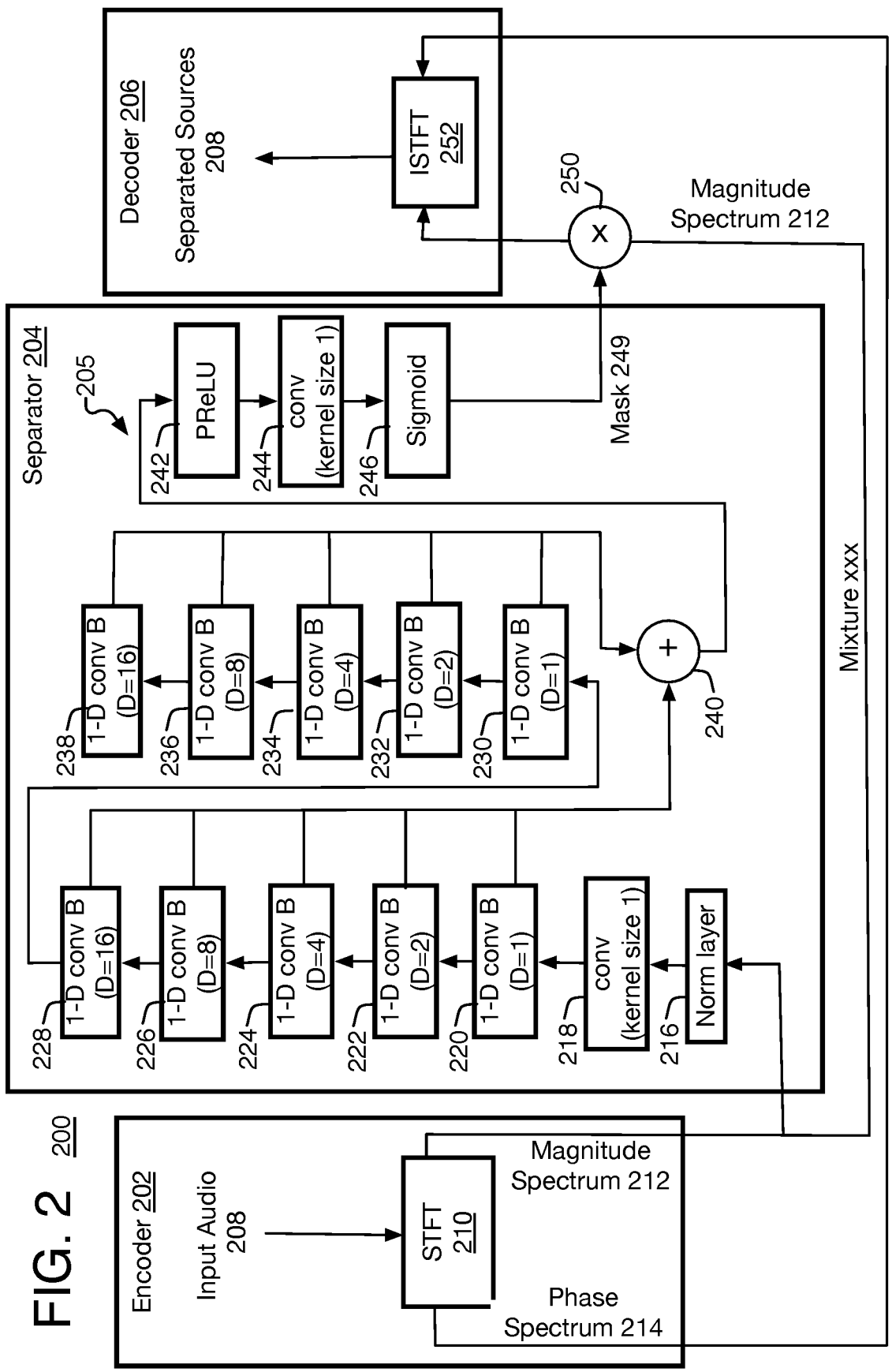
FIG. 2 is a schematic diagram of a dynamic noise suppression system according to at least one of the implementations herein.

Referring now to FIG. 2 for more detail, an example real-time DNS system or device (or architecture) 200 to perform the method 100 and/or 150 is described and has an encoder 202, a separator 204, and a decoder 206. The DNS system 200 may be based on temporal convolutional network (TCN) architecture with short time Fourier transform (STFT) input features. For more details, see, Real-time dynamic noises reduction using convolutional networks, U.S. patent application Ser. No. 17/033,605, filed Jan. 14, 2021, which is incorporated herein for all purposes.

Encoder 202 is coupled to separator 204, multiplier 250, and decoder 206. Separator 204 also is coupled to multiplier 250. Decoder 208 also is coupled to multiplier 250. The encoder 202 is used to determine the sinusoidal frequency and phase content of an input audio signal 208 with dynamic noise. This is accomplished using a STFT 210. The process approximates a magnitude spectrum 212 and a phase spectrum 214 of the input audio signal 208. The output magnitude spectrum from the STFT is used as input to the separator 204 and may be in the form of an input kernel of 1×1×(number of frequency bins) of magnitudes.

The separator 204 is used to separate speech from dynamic noise to generate a noise suppression mask 249 that can be applied to a version of the audio signal. The separator 204 comprises a neural network 205 that may be a TCN. The network 205 receives the magnitude spectrum 212 in the form of the encoder kernel and estimates a weighting function, i.e., the mask 249, for the magnitude spectrum. The mask 249 may be a continuous signal in time having values between <0, 1>, with 0 indicating all noise and 1 indicating all speech. In other words, the mask 249 provides an indication of areas where there is speech and areas where there is noise.

The multiplier 250 (also referred to as mixer or mixture unit) receives the mask 249 from the separator 204 and the magnitude spectrum 212 from the encoder 202 as input. The multiplier 250 applies the mask 249 to the magnitude spectrum 212 to achieve a denoised (cleaner) magnitude spectrum (i.e., speech).

The decoder 206 receives the denoised magnitude spectrum from the mixer 250 and the original phase spectrum 214 from the encoder 202. The decoder 206 may use an inverse short-time Fourier transform (iSTFT) unit 252 to reconstruct the audio signal without dynamic noise by calculating the iSTFT of the denoised magnitude spectrum and using the original phase spectrum 214 of the audio signal.

In operation, the STFT unit 210 at the encoder 202 may use an FFT (Fast Fourier Transform) window of 32 ms and a hop size of 8 ms in performance of the STFT. Other FFT window sizes and/or hop sizes may be used as well.

The network 205 of the separator 204 comprises, in sequence, a normalization layer block 216, a bottleneck 1×1 convolutional block 218 with kernel size as 1, two stacks of 1-D dilated convolutional blocks 220 to 238 numbered evenly, a parametric rectified linear unit (PReLU) block 214, a spreader 1×1 convolutional block (kernel size is 1) 244, and an activation function block, such as a Sigmoid block 246. Each block may have one or more neural network layers including at least a main task layer (such as a convolutional layer) and supporting layers such as ReLU, and so forth.

The normalization layer block 216 normalizes the distributions of intermediate layers and enables smoother gradients, faster training, and better generalization accuracy. The bottleneck 1×1 convolutional block 218 performs dimension reduction by controlling the depth of the input volume of the data as it passes to the next layer.

Then, a first stack of 1-D blocks 220 to 228 each provide a secondary (or skip-connection) output to an adder 240 in addition to an output to the next 1-D convolutional block in the sequence. A second stack of the 1-D convolutional blocks 230 to 238 also provide a secondary (or skip-connection) output to the adder 240 in addition to an output to the next 1-D convolutional block, except the last 1-D convolutional block 238 that provides its output only to the adder 240.

By one approach, the 1-D convolutional blocks differ only by a dilation factor in a depth-wise convolution layer within each 1-D convolutional block. In a single stack of the 1-D convolutional blocks, a dilation factor increases exponentially with each 1-D convolutional block in a stack of the 1-D convolutional blocks. For X number of convolutional blocks in a stack, the dilation factor is $2^X$. The stack may be repeated N times, here being two. The dilation factors increase exponentially to ensure a sufficient temporal context window needed to model long-term dependencies of the speech signal. The complexity of the network 205 is defined using two main parameters, the number of 1-D convolutional blocks in the stack, and the number of repetitions of the stacked blocks. In one example approach, the network 205 uses five (5) stacked convolutional blocks repeated two (2) times. As shown in FIG. 2, the dilation for a stack of five layers is 1, 2, 4, 8 and 16, respectively.

The summed output provided by adder 240 is then provide to the activation function (PReLU) block 242, the 1×1 convolution block 244, and the Sigmoid block 246 for mask estimation. Together, blocks 242 through 246 estimate the noise suppression or separation mask 249 for the speech signal.

Each 1-D convolutional bock 220 to 238 has its own sequence of layers including pointwise convolutional layers. The disclosed weight sharing groups (FIGS. 3A and 3B) and input groups (FIGS. 4A and 4B) may be used with any one or more of the pointwise convolutional layers mentioned herein and as mentioned above, including any of the pointwise convolutional layers of the 1-D convolutional blocks or other layers of the separator neural network 205 of DNS system 200 including the bottleneck layer 218 and the spreader layer 244, and in order to substantially decrease memory capacity requirements to perform the noise suppression, and without significantly reducing the quality of the resulting denoised audio signal.

Figure 3A:
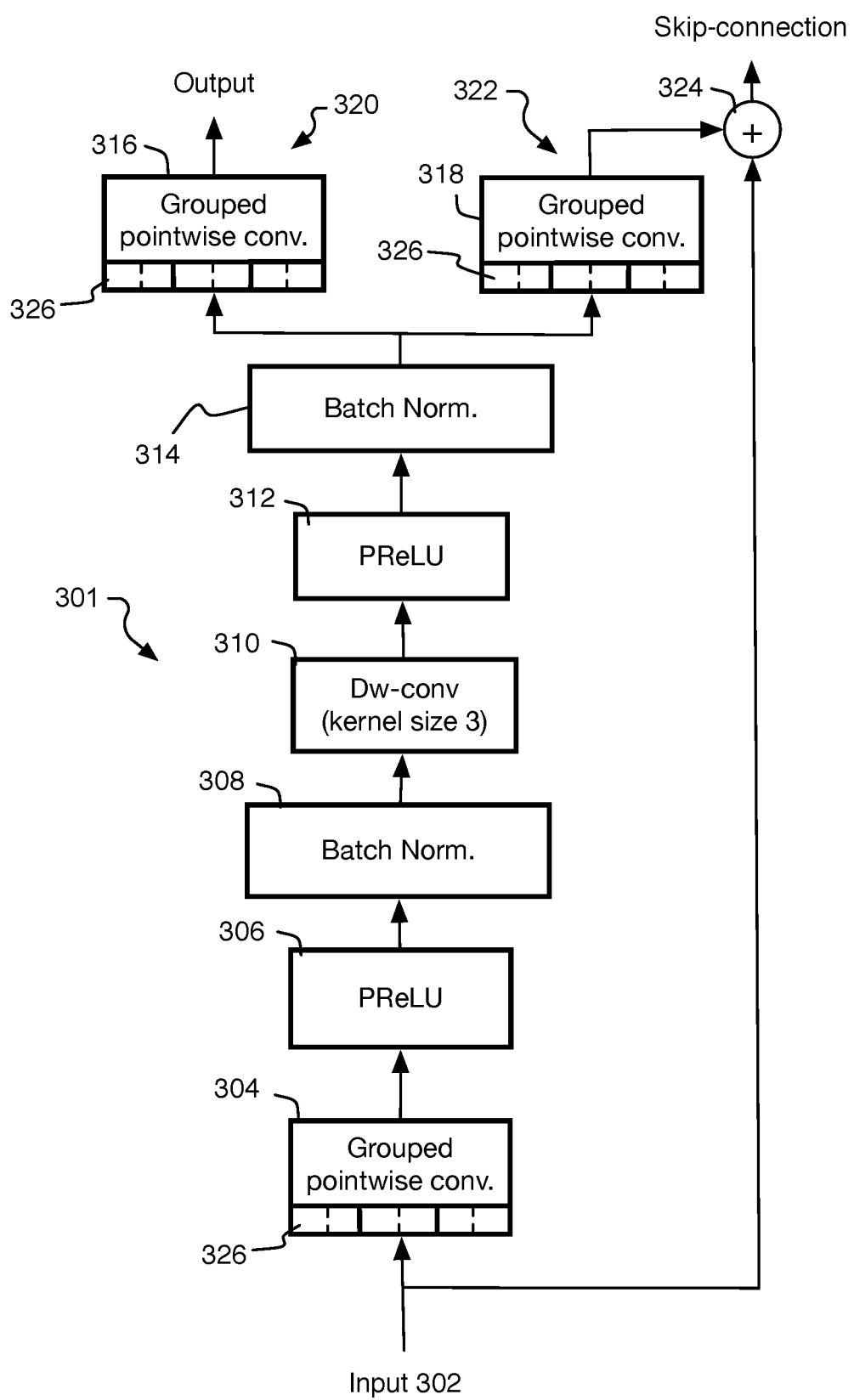
FIG. 3A is a schematic diagram of one alternative of neural network architecture of the system of FIG. 2 and according to at least one of the implementations herein.

Referring to FIG. 3A, an example scalable 1-D convolutional block 300, such as one of the 1-D convolutional blocks 220 to 238 on the DNS system 200, has one or more pointwise convolutional layers, and in this case, three pointwise convolutional layers 304, 316, and 318, in a sequence of layers 301. Each pointwise convolutional layer that uses weight sharing groups is referred to as a grouped pointwise convolutional layer (or grouped PCL).

The layer sequence 301, in order, has a first grouped pointwise 1-D convolutional layer 300, a PReLU layer 306, a batch normalization layer 308, a depth-wise convolutional layer 310, another PReLU layer 312, and another batch normalization layer 314. Thereafter, the sequence 301 has two branches, one being an output branch 320 that provides the input to a next layer or block in the separator neural network 205, such as the next 1-D convolutional block, and a skip-connection branch 322. Each branch 320 and 322 may have its own grouped pointwise convolutional layer 316 or 318, respectively. The grouped PCL 318 on the skip-connection branch 322 provides its output to an internal block adder 324 that sums the output of the skip-connection grouped PCL 318 with the block input 302 to modify the input features. The internal block sum is then provided to the adder 240 of the separator network 205.

In this example, the input may be provided in 128 channels, which is increased to 512 channels by the first grouped PCL 304. The channels remain the same until reduced back to 128 channels by the output and skip-connection PCLs 316 and 318. The output here also may be 128 channels. An input vector 326 that has grouped channels to share weights as mentioned herein may be provided for one or more of the PCLs 304, 316, and/or 318.

The depth-wise layer 310 may have a 3×1 convolution (or kernel) and dilation factor $2^X$. Since the dilation factor only influences depth-wise convolution, this may be the only type of convolutional layer on the separator 204 that has a kernel different than 1×1. Some model size reduction is achieved just by using the depth-wise convolutions and the pair of point-wise convolutions at the output branches 320 and 322 of the 1-D convolutional bock 300 rather than regular convolutional layers. However, while the 1-D convolutional block 300 uses reduced (from the perspective of memory) depth-wise convolution, the three pointwise convolutional layers 304, 316, and 318 still occupy a significantly higher amount of memory without the grouping described herein.

Figure 3B:
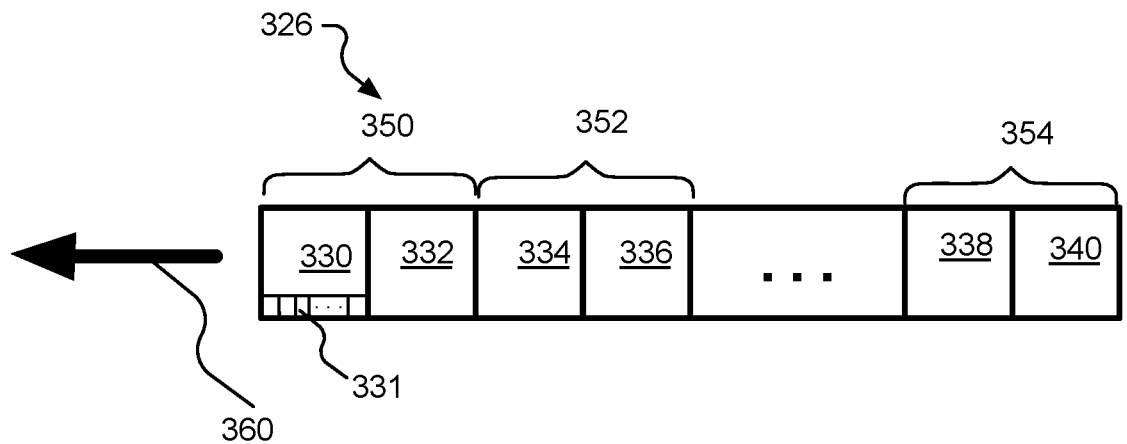
FIG. 3B is a schematic diagram of an input vector used with the neural network sequence of FIG. 3A and according to at least one of the implementations herein.

Referring to FIGS. 3A and 3B with regard to the weight sharing groups, one or more of the PCLs 304, 316, and 318 may be grouped PCLs. The PCLs 304, 316, and 318 are shown with a representation of the input vector 326 with grouped inputs that share weights. The representation of the input vector 326 may have channels 330 to 340 numbered evenly and each channel may have multiple inputs or features 331. As mentioned, each channel may have at least one feature but otherwise about 64 to 2048 or other number of features, and each input vector may have any number of channels such 128, 256 or 512. Each feature 331 may correspond to a weight assigned to an input location of the input vector for that feature. Thus, and also as mentioned, while the inputs or features (or channels) of the input vector are discussed herein as having the weights or weight values, this refers to a weight buffer or memory having weight values that are to be multiplied by, or otherwise applied to, corresponding input values or features in the input vector. The weights are generated during training of the neural network 205 and may be stored in an internal or local weight buffer of the neural network, and typically on-board an accelerator as described herein.

In this example, every pair 350, 352, 354 of the channels 330 to 340 is a group that shares a weight value between the individual group's channels (such as channels 330 and 332 for group 350). The arrow 360 represents that the entire input vector is still input into the PCL (or other layer) together (all loaded into input nodes of an MAC together for example) despite the weight sharing group assignments. As mentioned, however, any number of channels may share the same weight values in a weight sharing group, although 2 to 32 weight sharing groups in an input vector has been found to perform adequately.

The number of channels in a group may be predetermined and fixed by heuristics for example, and for the operation of the DNS system. Other variations as to which PCLs are grouped PCLs are described above. While as shown, consecutive channels with consecutive features are formed into groups, the channels and/or features in a single group may not always be consecutive in the input vector. Also as mentioned, since the first or encoder kernel from the encoder 202 has each input of the input vector or kernel as a frequency bin value, it can be stated that the subsequent input vectors to each subsequent block or layer also at least cooperatively represent the frequency bins. As mentioned with this weight sharing group structure, a number of inputs can be assigned to the same weight value stored in memory, thereby reducing the number of parameters stored for the neural network, which reduces the model size.

The DNS neural network can be trained in many different ways. By one example, the system may use training and validation single channel datasets from real-world recordings with a 16 kHz sampling rate, for example. For speech content, the training may be English language recordings from Speecon, Libri Vox, and VOICES corpora, and so forth. The noise corpus may be created both from proprietary and public data bases. It may include stationary noises, dog barks, baby crying, baby unarticulated noises, keyboard typing and children playing, and so forth. A two stage augmentation may be used where noise is mixed into speech corpora data in a first stage. The first stage also may randomly adjust levels both of each utterance and final augmentation in a range from −12 to +12 SNR. The first stage produces a training set with 623 k utterances and a validation set with 105 k utterances.

The second stage of augmentation is "dynamic mixing" similar to one described in N. Zeghidour, et al., "Wavesplit: End-to-End Speech Separation by Speaker Clustering", arXiv: 2002.08933, (2020), or in music source separation, See S. Uhlich, et al., "Improving music source separation based on deep neural networks through data augmentation and network blending," IEEE International Conference on Acoustics, Speech and Signal Processing (ICASSP), IEEE, pp. 261-265 (2017), and A. Defossez, et al., "Demucs: Deep extractor for music sources with extra unlabeled data remixed," arXiv: 1909.01174 (2019). The second stage is performed during each epoch of the training and validation in order to (a) add reverb for 30% of randomly chosen utterances, (b) trim recording to 4 seconds length with random start offset, and (c) add pink and white noise for 10% of randomly chosen utterances. During the second stage, "targets post-processing" is performed and includes (1) replacement of all non-speech parts with zeroes by applying VAD on target and setting zeroes for signal period where the voice activity was not detected, and (2) replacement of 10% of target signals with zeroes. This idea is similar to post processing on IAM, See X. Zhang, et al., "Low-Delay Speech Enhancement Using Perceptually Motivated Target and Loss", Interspeech (2021). The second stage does not change the quantity of utterances in the datasets, but allows the datasets to be randomized during each epoch.

Also during training, setting the convolutional weight kernel or filter to provide the same weight for particular input locations in grouped channels during the training may be a setting on neural network training and implementation applications such as Python with a Pytorch library for example, and others, for example. Thus, the gradient descent weight computations during training adjust the weights to be the same and assigns multiple channels of a single weight sharing group to a single weight value stored in memory while finding the best output for the network. The number of channels in a group and the number of groups in an input vector all may be predetermined and adjusted during the training.

For the training itself, one example approach uses an STFT encoder with 32 ms frames, 8 ms frame shift, and Hann window. The four second utterances may be used as the input to the network with 501 log magnitude frames with 256 frequency bins (where the DC component may be omitted). A batch size of 12 examples or utterances may be used, and the model can be trained over 100 epochs. An optimizer, such as an Adam optimizer, may be used with initial learning rate value equal 0.001. For learning rate scheduling, stochastic gradient descent with warm restarts may be used where $T_0$ was 100, and $T_{mult}$ was 1. Only descent from first to last epoch was performed without restarts. This concentrates on causal implementation of the model. The training may be performed in many different ways and is not limited to the training method used here.

Figure 4B:
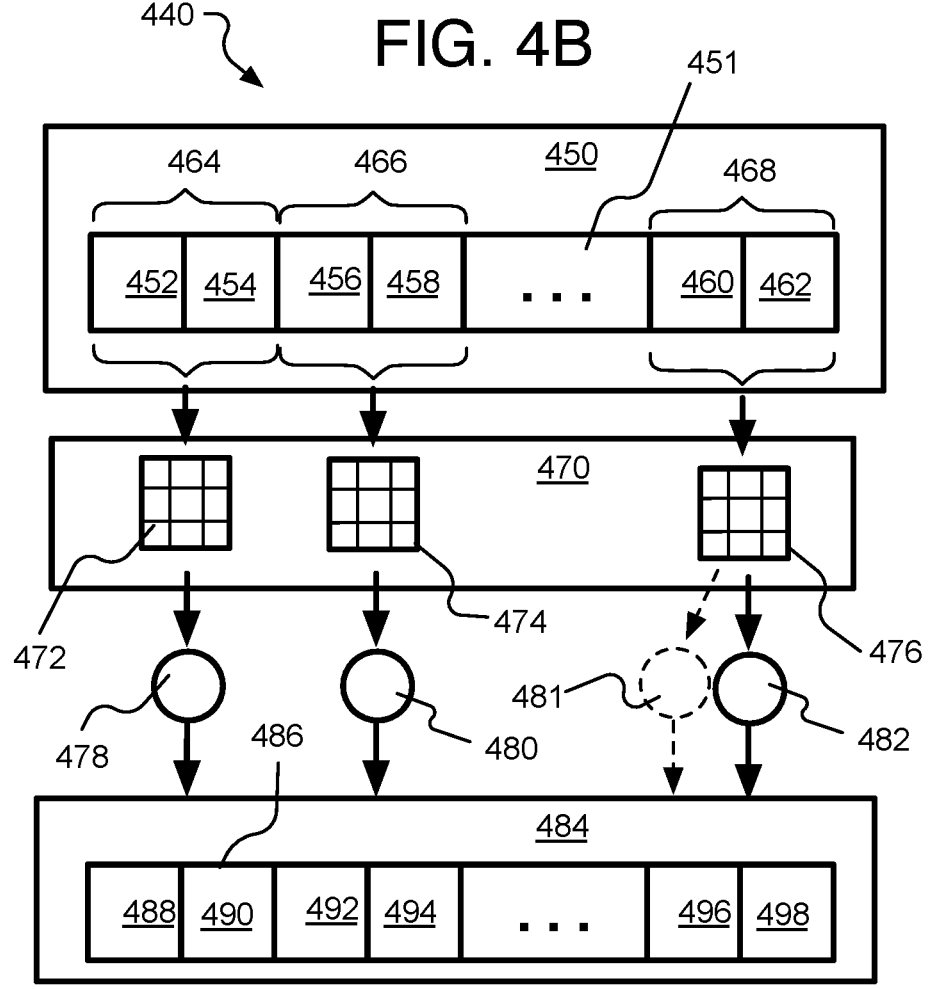
FIG. 4B is a schematic diagram of an input vector used with the neural network sequence of FIG. 4A and according to at least one of the implementations herein.
Figure 4A:
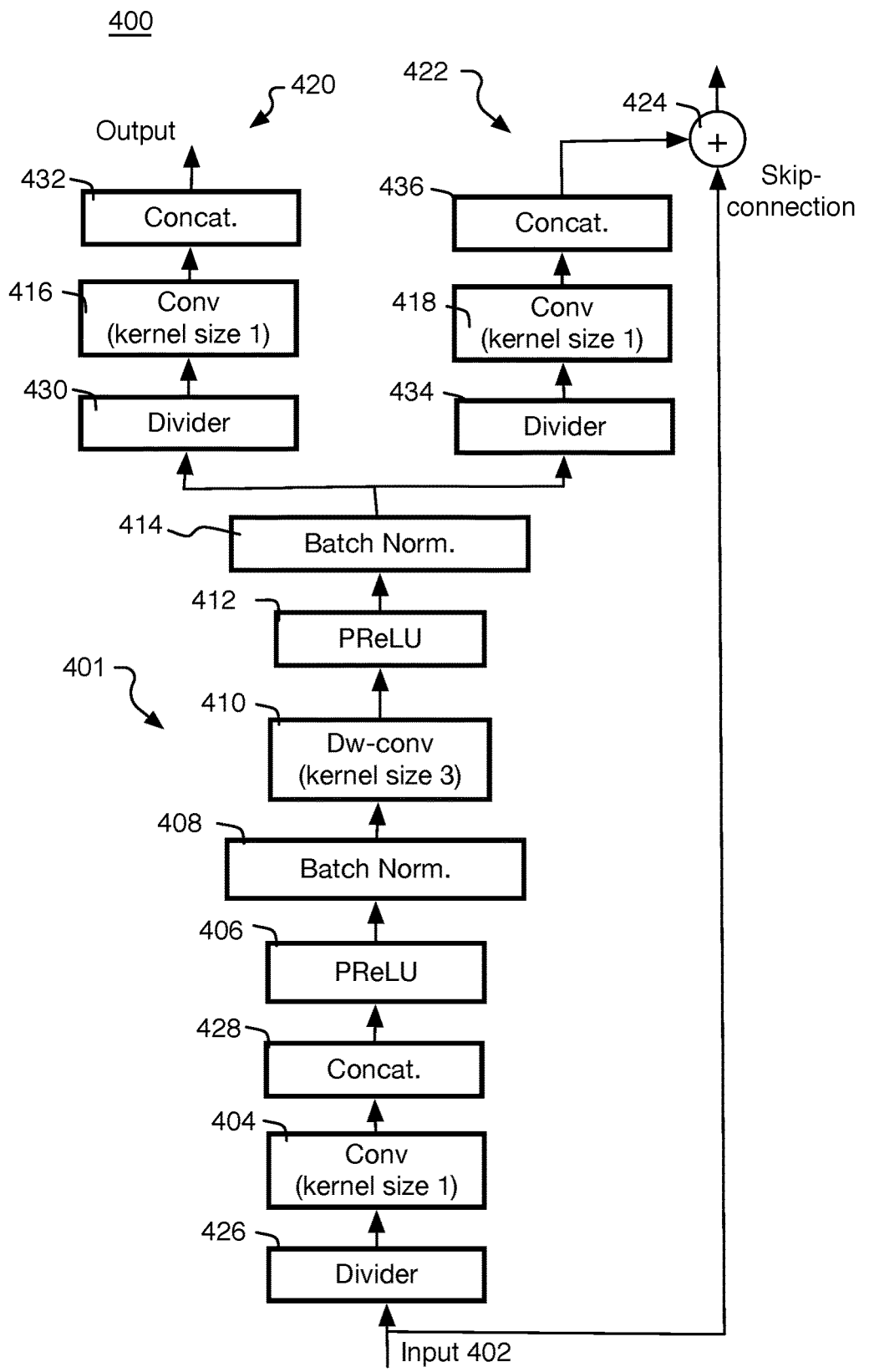
FIG. 4A is a schematic diagram of another alternative neural network architecture of the system of FIG. 2 and according to at least one of the implementations herein.

Referring to FIG. 4A, a scalable 1-D convolutional block 400 uses input groups to reduce the number of parameters, and in turn model size. The block 400 may have many of the same or similar layer structures as block 300 so the layers described above for block 300 need not be described again here for 1-D convolutional block 400. The use and number of 1-D convolutional blocks 400 also is the same as blocks 300 as described above. The block 400, however, replaces the grouping technique of weight sharing groups with the grouping technique of input groups (although the two could be used together as mentioned above).

To accomplish the input grouping, one or more pointwise (kernel size 1) convolutional layers 404, 406, and/or 418 of the 1-D convolutional block 400 is preceded by a divider layer 426, 430, or 434 that divides the channels in an input vector into groups, or more precisely, assigns the channels to groups, for processing at one or more of the PCL layers 404, 416, and/or 418 A subsequent concatenation layer 428, 432, or 436 concatenates the data output form the PCL 404, 416, or 418 into a single output vector that is a next input vector for a next block, layer, or operation. The PCL then processes or propagates individual input groups separately from the other groups each with its own output rather as separate channels to form a single output set reduces the number of parameters, and in turn model size, because a single output of the PCL is produced from less input features, and the groups share parameters rather than being different for each channel so that fewer operations and fewer parameters are used.

Referring to FIG. 4B, an example input group sequence 440 represents the operation of the input groups. The sequence 440 has a divider (or divider layer) 450, a PCL 470, and a concatenation layer (or concatenator) 484. The divider 450 receives an input vector 451 with channels 452 to 462, numbered evenly, and by one form 128 to 512 channels although other number of channels maybe provided in the input vector. Each channel may have one or more features (or inputs) such as 64 to 2048 features as mentioned above.

As shown here, the divider 450 has assigned every consecutive pair of channels to an input group 464, 466, and 468, although many different variations can be used as discussed herein. It has been found that 2 to 16 input groups per input vector has been found to be adequate. The dividers 426, 430, and/or 434 may then provide the assignments to PCL 470 and the entire input vector with channels assigned to the groups and may be input to the PCL 470.

The PCL 470 receives the assignments and sets convolution filters (or kernels) 472, 474, and 476 to be applied separately to input nodes of the different groups 464 466 and 468 for example. The filters 472, 474, and 476 are shown with one filter per group, but any number of filters may be applied to a group as long as filtering operation for a single filter does not overlap groups. The filters may have weights (or parameters or coefficients) that are different from group to group but is the same one or more filters that is applied to a single group so that the channels in that single group are sharing weights or parameters. This operation may refer to loading weights into a local or internal weight buffer to load the weights into layer processing circuitry such as an MAC for example. It will be appreciated that the channel-to-group assignments may be fixed by input vector channel and feature positions, or could vary from PCL to PCL or even from epoch to epoch depending on other factor (such as which epoch it is), where the assignment may be provided from the divider 450 to a PCL or neural network control, for example, to perform these operations. By one approach, the divider 450 is considered to be a part of the PCL itself rather than considered to be a separate layer or unit of the neural network. The PCL 470 then provides one or more separate outputs 468, 480, and 482 of each group. Output 481 shows that an individual group may have more than one output.

The concatenator or concatenation layer 484 then concatenates the outputs 478, 480, 481, and 482, and by one example, in order of the groups as in sequence in the input vector 451, although other variations could be used as desired. Here a complete output vector 486 is a new input vector for a next layer or operation after the concatenation layer 484.

The input groups may be used on any combination of the PCLs on the DNS system as mentioned for the weight sharing groups and as desired, including only on the 1-D convolutional blocks, the bottleneck and/or spreader PCLs, or any combination of them. Also as mentioned, groups with 2 to 16 inputs each o has been found to be acceptable.

As to the training of the DNS with input groups, the generation of the dataset as well as the basic training operations not specifically related to the grouping for the training of the DNS with the weight sharing groups is the same or similar here for the DNS with the input groups. Specifically for the DNS with the input groups, the description of the neural network layer structure as described above is all that is needed for training regarding the input grouping.

Note that quantization, distillation, factorization, and NAS can be used as further included operations, or as additional operations to the disclosed solutions for any of the neural networks mentioned herein, and as desired. It also will be understood that the groups described herein could be added to layers of a time domain neural network such as a time domain separation network (TasNet).

Also, the disclosed method may be implemented in firmware and one or more dedicated audio chips. The DNS may be offloaded to a Gaussian and neural accelerator (GNA), for example, and as described elsewhere herein. Also, idle graphics processing units (GPUs) can also be used to take up at least some of the computational load to process the audio dynamic noise suppression neural network here as well.

Experimental Results

The relationships for the input groups among grouping type, grouping size, and model size are listed below on a Table 1 to show how the model size can be predetermined and controlled. Measurements were performed for grouping channels in a range from 2 to 16, which produced model sizes from 1.06M to 111K parameters.

TABLE 1

Relationship between grouping type, grouping size, and model size for input groups (and Quality: G-MOS scores obtained in an Athena certification test for models trained with different grouping type and its value).

| Model | Para. | k | type | G-MOS | S-MOS | N-MOS | MACs (on 4-second input) |
|---|---|---|---|---|---|---|---|
| TasNet | 1063 k | 1 | N/A | 3.56 | 3.83 | 3.88 | 542M |
| gTasNet | 899 k | 2 | A | 3.54 | 3.83 | 3.84 | 460M |
| | 817 k | 4 | A | 3.53 | 3.83 | 3.82 | 419M |
| | 776 k | 8 | A | 3.47 | 3.79 | 3.77 | 398M |
| | 756 k | 16 | A | 3.50 | 3.82 | 3.79 | 388M |
| | 735 k | 2 | B | 3.51 | 3.83 | 3.77 | 378M |
| | 572 k | 2 | C | 3.49 | 3.78 | 3.83 | 296M |
| | 572 k | 4 | B | 3.49 | 3.80 | 3.79 | 296M |
| | 490 k | 8 | B | 3.50 | 3.81 | 3.78 | 255M |
| | 449 k | 16 | B | 3.49 | 3.80 | 3.78 | 234M |
| | 326 k | 4 | C | 3.49 | 3.78 | 3.82 | 173M |
| | 203 k | 8 | C | 3.43 | 3.75 | 3.75 | 111M |
| | 141 k | 16 | C | 3.41 | 3.68 | 3.75 | 81M |
| | 80 k* | 16 | D | 3.17 | 3.63 | 3.34 | 50M |

To show the impact of the disclosed method on DNS, several models were trained and evaluated. During the training, the only differences in the models were grouping type and grouping size. For group type, A has only the first PCL using the groups in the 1-D convolutional blocks, B has only the end branches using the groups in the 1-D convolutional blocks, C refers to all PCLs in the 1-D convolutional blocks using the groups, and D refers to all PCLs on the separator NN using the groups. As a result, the disclosed method of DNS model size scaling described herein enables a reduction in model size to a third compared to the conventional model (see K=4, type C versus the unchanged model size) and with very low impact on global mean opinion score (G-MOS) score, which here was only a 0.07 MOS score compared to baseline.

Figure 5:
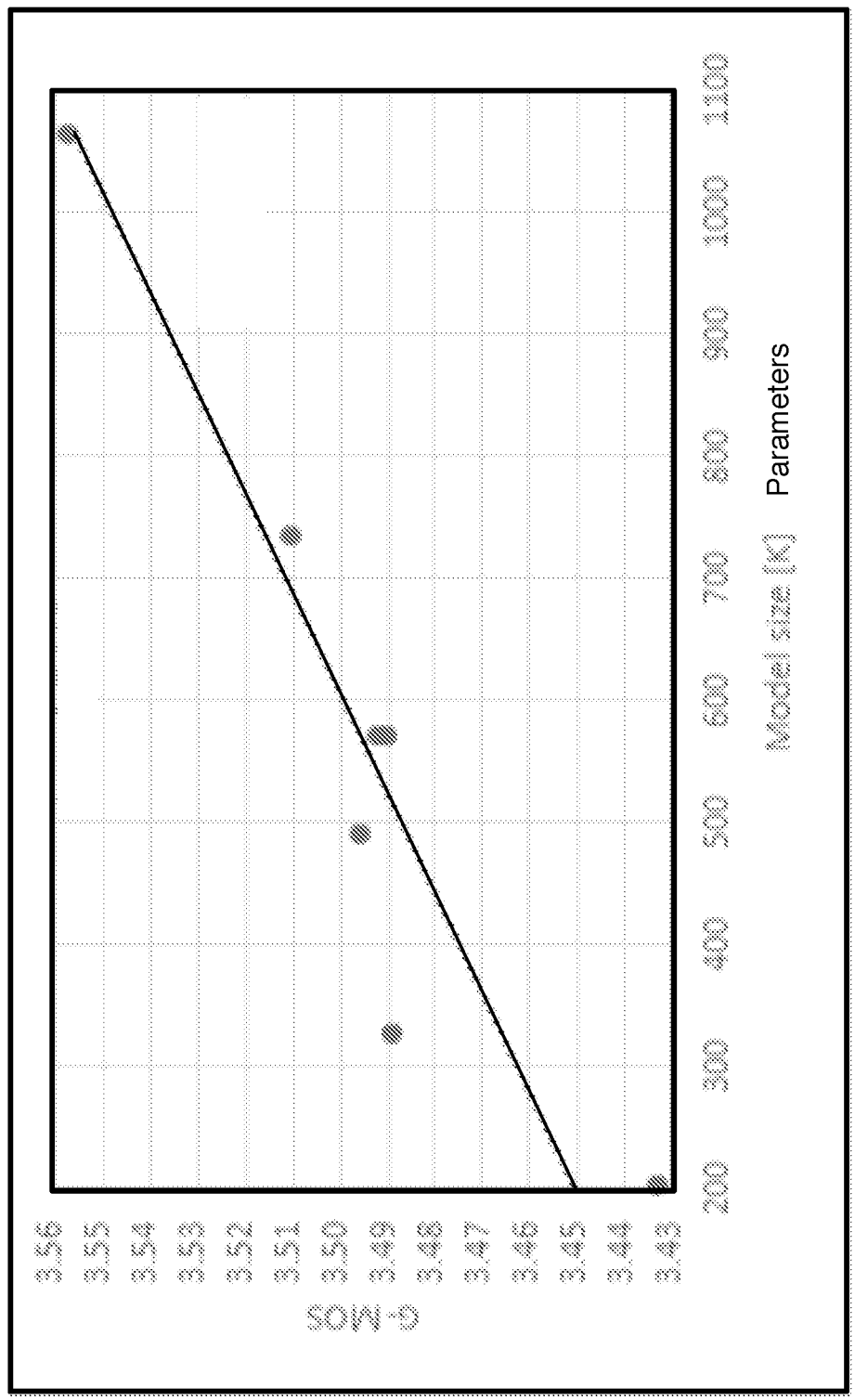
FIG. 5 is a graph showing noise reduction model size per G-MOS quality level in accordance with at least some implementations of the present disclosure.

Referring to FIG. 5, graph 500 presents the strong correlation between G-MOS scores and model size to show that model size scaling does correlate with its quality, and by 3

Quest scores that clearly correlate with model size. The Pearson correlation for G-MOS equals 0.97, for speech mean opinion score (S-MOS) 0.95 and for noise mean opinion score (N-MOS) 0.9. For model sizes up to 449*k, where k here is in a range from 2 to 16 input groups, and grouping type (which layer received the grouping) is A or B as described on table above, quality degradation is insignificant. The G-MOS score for a time domain audio separator neural network (TasNet) equals 3.56, and for the noise reduction model used herein with input groups and with 449*k parameters, the G-MOS was 3.49. For grouping type A or B, the grouping was found to impact mainly noise reduction capability (N-MOS) and does not affect speech quality (S-MOS). Further reduction of model size (models smaller than 449*k parameters) influences model quality. For some use cases, when a model size is a main factor that determines if speech enhancement can be applied, it might be beneficial to utilize grouping of type C with k>4.

In addition, any one or more of the operations of the processes in FIGS. 1A and 1B, may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 6:
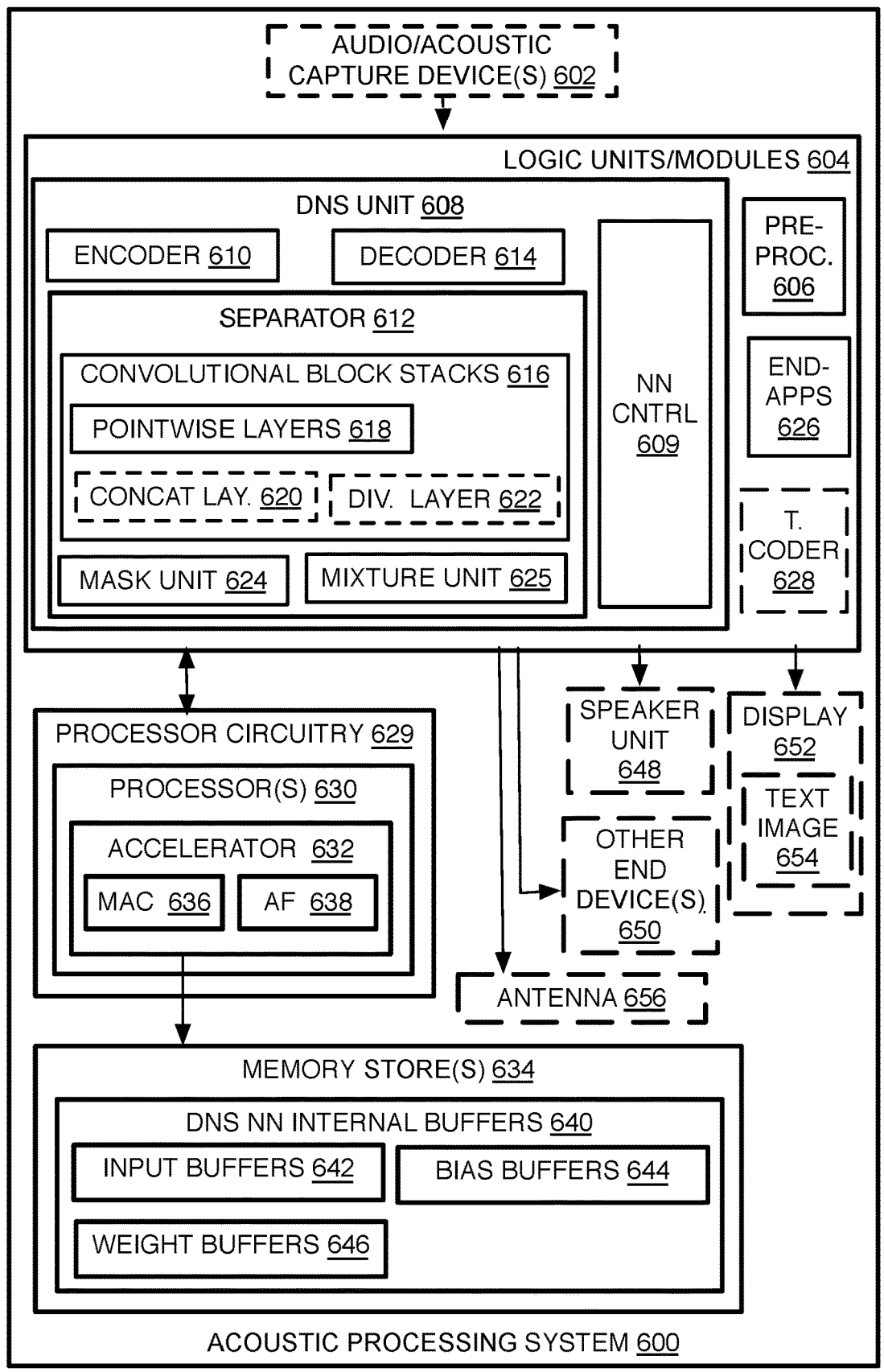
FIG. 6 is a schematic diagram of an example system.

Referring to FIG. 6, an example acoustic processing system 600 is arranged in accordance with at least some implementations of the present disclosure. In various implementations, the example acoustic processing system 600 may have an audio/acoustic capture device(s) 602 to form or receive acoustical signal data. This can be implemented in various ways. Thus, in one form, the acoustic processing system 600 is a device, or is on a device, with one or more microphones, and one or a network of the devices 602 provides the acoustic signals or data used for noise suppression described above and that may be performed by one of the networked devices 602. In other examples, the acoustic processing system 600 may be in communication with one or a network of microphones, and may be remote from these acoustic signal capture devices such that logic modules (or circuits or units) 604 may communicate remotely with, or otherwise may be communicatively coupled to, the microphones for further processing of the acoustic signals or data.

In either case, such technology may include a telephone, a smart phone, a tablet, laptop or other computer, dictation machine, other sound recording machine, a mobile device or an on-board device, or any combination of these. Thus, in one form, audio capture device 602 may include audio capture hardware including one or more sensors as well as actuator controls. These controls may be part of a sensor module or component for operating the sensor. The sensor component may be part of the audio capture device 602, or may be part of the logical modules 604 or both. Such sensor component can be used to convert sound waves into an electrical acoustic signal. The audio capture device 602 also may have an A/D converter, other filters, and so forth to provide a digital signal for acoustic signal processing.

In the illustrated example, the logic modules or circuitry 604 may include a pre-processing unit 606 to handle any pre-processing tasks that may be needed at least to convert the audio signals into a format sufficient for the noise suppression described above. A dynamic noise suppression unit 608 performs the noise suppression and may or may not be considered part of the pre-processing unit as well. The dynamic noise suppression unit 608 may have a neural network (NN) control 609, DNS encoder 610, separator 612, and DNS decoder 614 where the separator as described above. While not all of the neural network layers and units forming the separator 612 are shown here, most relevant are the convolutional block stacks 616 where each block may have a sequence of neural network layers and other units, and including at least one grouped pointwise layer 618 and as described above with structures 200, 300, or 400 (FIGS. 2-4). The pointwise layers 618 optionally individually may be accompanied by a concatenation layer 620 and a dividing layer 622, also as described above. The separator 612 also may have a mask unit 624 to generate the mask itself and provide the mask to a mixture unit 625 to apply the mask to the encoded audio data providing now denoised audio to the decoder 614, and all as described above. Other end applications 626, such as equalizer or audio emitting-related applications, automatic speech or speaker recognition, and so forth, then may use the output denoised audio. The logic modules 604 also may include a transmission coder 628 to transmission encode the output audio for transmission to another device when needed. These units may be used to perform the operations described above where relevant and as suggested by the similarity of the title of the unit to those units described above.

The acoustic processing system 600 may have processor circuitry 629 that forms one or more processors 630, such as the Intel Atom®, and may include digital signal processors (DSPs) and/or one or more dedicated audio accelerators 632 that may include firmware and one or more dedicated audio chips. For example, the DNS may be offloaded to a Gaussian and neural accelerator (GNA) that has multiply-accumulate circuits (MACs) 636, activation function circuits 638, as well as other circuits, for example.

The system 600 also may have memory stores 634 that may have DNS neural network internal buffers 636 such as input buffers 642, bias buffers 644, and weight buffers 646. The weight buffers may hold the shared weights that are shared by inputs to the pointwise layers as described above and/or to hold any of the other DNS-related data described above, including the audio signal data in any form mentioned such as magnitude or phase spectrum data and in any state or version, and any neural network data including inputs, outputs, intermediate features, the parameters, and so forth.

The system also optionally may have at least one local or remote communicatively connected speaker unit 648 to emit audio based on the input acoustic signals, one or more displays 652 to provide images 654 of text, for example, as a visual response to the acoustic signals, other end device(s) 650 to perform actions in response to the acoustic signal, and antenna 656 to transmit or receive data as needed.

In one example implementation, the acoustic processing system 600 may have the speaker unit 648, processor circuitry 629 forming at least one processor 630 communicatively coupled to the speaker 648, and memory 634 communicatively coupled to the processor 630. The antenna 656 may be provided to transmit the output signals or other relevant commands to other devices that may use the output signals. Otherwise, the results of the output signals may be stored in memory 634. As illustrated, any of these components may be capable of communication with one another and/or communication with portions of logic modules 604 and/or audio capture device 602. Thus, processors 630 may be communicatively coupled to the audio capture device 602, the logic modules 604, and the memory 634 for operating those components.

Although acoustic processing system 600, as shown in FIG. 6, may include one particular set of blocks or actions associated with particular components or modules, these blocks or actions may be associated with different components or modules than the particular component or module illustrated here.

Figure 7:
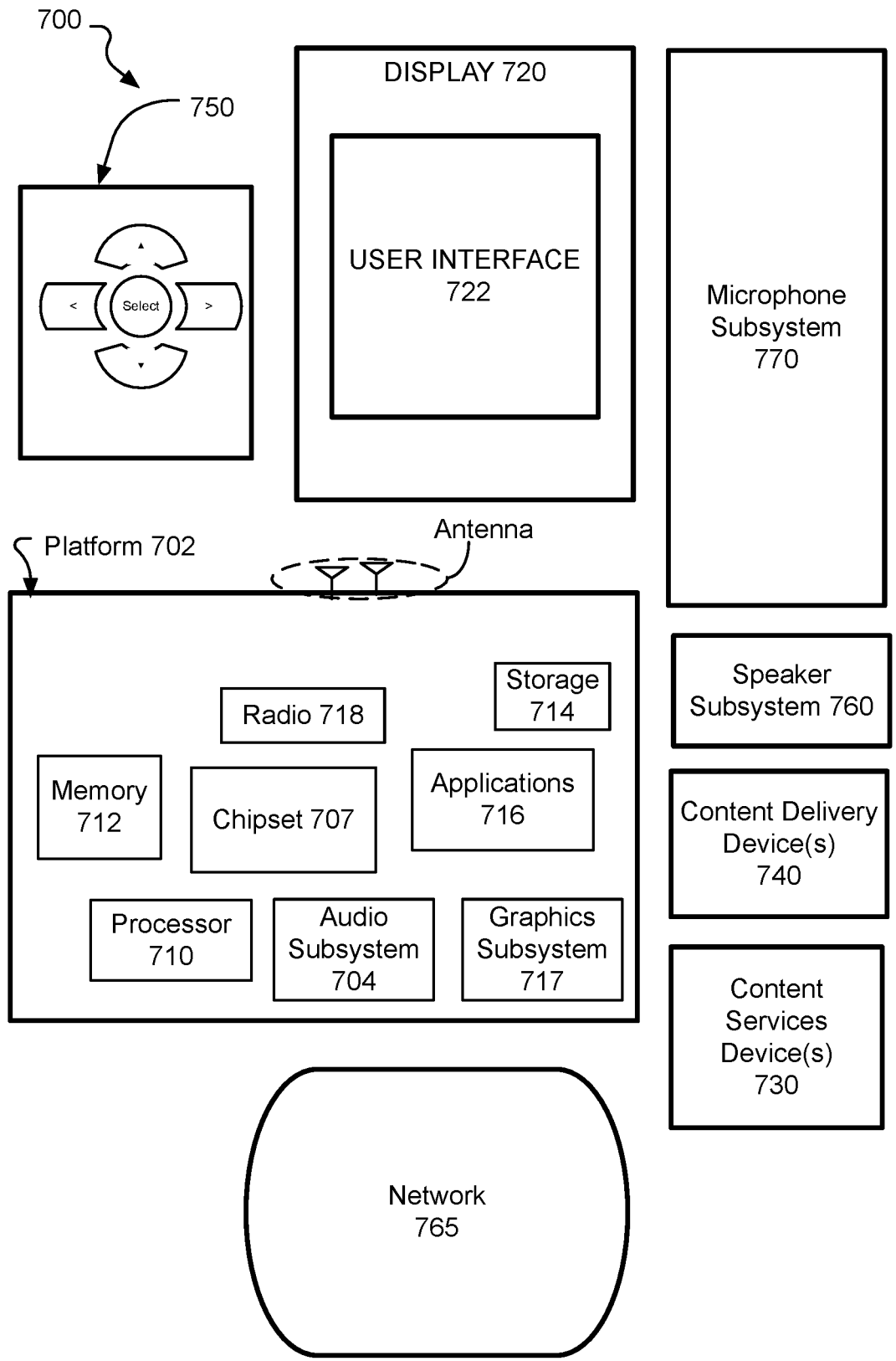
FIG. 7 is a schematic diagram of another example system.

Referring to FIG. 7, an example system 700 in accordance with the present disclosure operates one or more aspects of the acoustic processing system described herein. It will be understood from the nature of the system components described below that such components may be associated with, or used to operate, certain part or parts of the speech processing system described above. In various implementations, system 700 may be a media system although system 700 is not limited to this context. For example, system 700 may be incorporated into, or receive acoustic signals or data from, one or multiple microphones of a network of microphones, or multiple systems 700 networked together may be used when each one contributes a different microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any acoustic processing device receiving acoustic signals or data of a network of microphones.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702, speaker subsystem 760, microphone subsystem 770 to provide the acoustic signals or data described above, and/or display 720. Some of these components are described in greater detail below.

In various implementations, platform 702 may include any combination of a chipset 707, processor 710, memory 712, storage 714, audio subsystem 704, graphics subsystem 717, applications 716 and/or radio 718. Chipset 707 may provide intercommunication among processor 710, memory 712, storage 714, audio subsystem 704, graphics subsystem 717, applications 716 and/or radio 718. For example, chipset 707 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Audio subsystem 704 may perform processing of audio such as acoustic signals to perform the noise suppression described herein and then to emit the audio or for other applications such as speech recognition and/or voice recognition. The audio processing techniques described herein may be implemented in various hardware architectures. Thus, the audio subsystem 704 may comprise one or more processing units, memories, and shared or audio dedicated accelerators, such as a GNA. Such an audio subsystem may be integrated into processor 710 or chipset 707. Alternatively, a discrete audio processor may be used. Thus, in some implementations, the audio subsystem 704 may be a stand-alone card communicatively coupled to chipset 707. As still another implementation, the audio functions may be provided by a general purpose processor, including a multi-core processor. An interface may be used to communicatively couple the audio subsystem 704 to a speaker subsystem 760, microphone subsystem 770, and/or display 720. In further implementations, the functions may be implemented in a consumer electronics device.

Graphics subsystem 717 may perform processing of images such as still or video for display. Graphics subsystem 717 may be a graphics processing unit (GPU) or a visual processing unit (VPU), for example. An analog or digital interface may be used to communicatively couple graphics subsystem 717 and display 720. For example, the interface may be any of a High-Definition Multimedia Interface, Display Port, wireless HDMI, and/or wireless HD compliant techniques. Graphics subsystem 717 may be integrated into processor 710 or chipset 707. In some implementations, graphics subsystem 717 may be a stand-alone card communicatively coupled to chipset 707.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720, speaker subsystem 760, and microphone subsystem 770. Platform 702 and/or content services device(s) 730 may be coupled to a network 765 to communicate (e.g., send and/or receive) media information to and from network 765. Content delivery device(s) 740 also may be coupled to platform 702, speaker subsystem 760, microphone subsystem 770, and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and speaker subsystem 760, microphone subsystem 770, and/or display 720, via network 765 or directly. It will be appreciated that the content may be communicated unidirectionally and/or bidirectionally to and from any one of the components in system 700 and a content provider via network 765. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multidimensional) data into a computer. Many systems such as graphical user interfaces (GUI), and televisions and monitors allow the user to control and provide data to the computer or television using physical gestures. The audio subsystem 704 also may be used to control the motion of articles or selection of commands on the interface 722.

Movements of the navigation features of controller 750 may be replicated on a display (e.g., display 720) by movements of a pointer, cursor, focus ring, or other visual indicators displayed on the display or by audio commands. For example, under the control of software applications 716, the navigation features located on navigation controller 750 may be mapped to virtual navigation features displayed on user interface 722, for example. In embodiments, controller 750 may not be a separate component but may be integrated into platform 702, speaker subsystem 760, microphone subsystem 770, and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example, or by auditory command. Program logic may allow platform 702 to stream content to media adaptors or other content services device(s) 730 or content delivery device(s) 740 even when the platform is turned "off." In addition, chipset 705 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various implementations, platform 702, speaker subsystem 760, microphone subsystem 770, and/or display 720 may be an integrated unit. Display 720, speaker subsystem 760, and/or microphone subsystem 770 and content service device(s) 730 may be integrated, or display 720, speaker subsystem 760, and/or microphone subsystem 770 and content delivery device(s) 740 may be integrated, for example. These examples are not meant to limit the present disclosure.

In various implementations, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 7.

Figure 8:
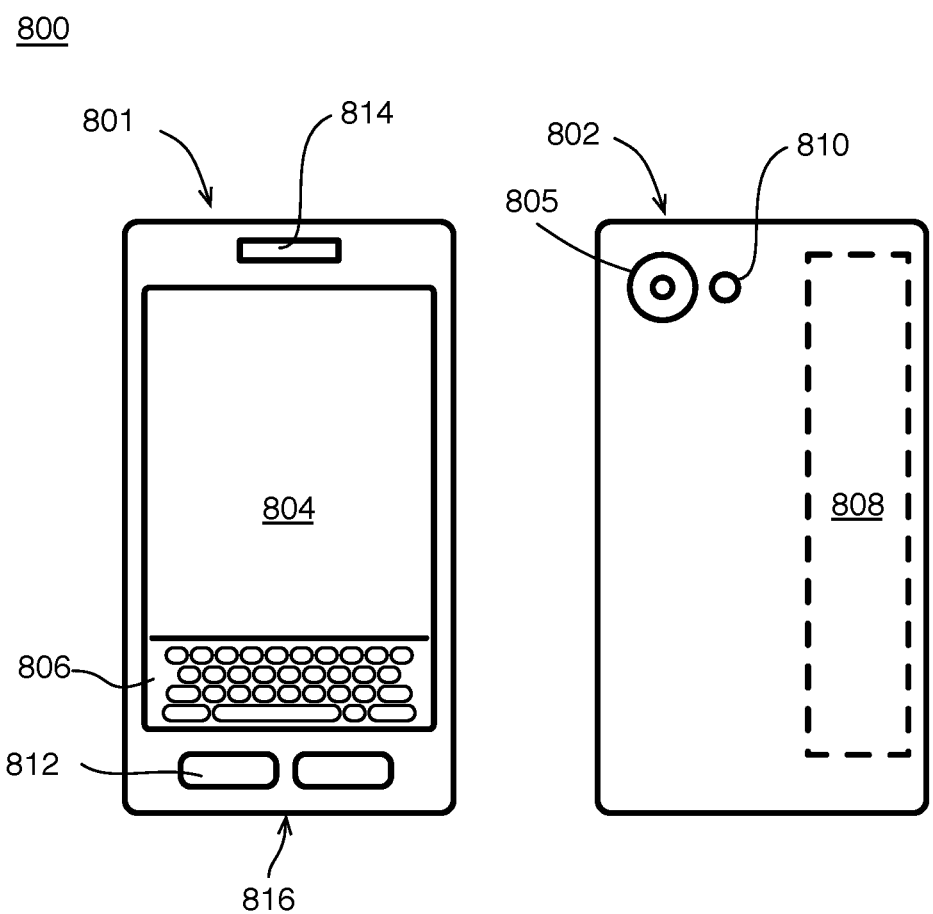
FIG. 8 is an example device, all arranged in accordance with at least some of the implementations of the present disclosure.

Referring to FIG. 8, a small form factor device 800 is one example of the varying physical styles or form factors in which system 600 or 700 may be embodied. By this approach, device 800 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system that receives acoustic signals or data from multiple microphones such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, microphone system or network, and so forth, and any other on-board (such as on a vehicle), or building, computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing with a front 801 and a back 802, a display or screen 804, an input/output (I/O) device 806, and an antenna 808. Device 800 also may include navigation features 812. Display 804 may provide images processed by any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, software and so forth. Information also may be entered into device 800 by way of a network of two or more microphones 816. Such information may be processed by a separation and localization device as described herein as well as other acoustic mixing devices, speech and/or voice recognition devices, and so forth, as part of the device 800. By one form, multiple devices 800 spaced from each may be used to perform the acoustic data collection described above. Device 800 also may provide audio responses via a speaker 814 or visual responses via the screen 804. The implementations are not limited in this context. The housing also may include a camera 805 and an illuminator 810.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, a computer-implemented method of audio processing, comprising: obtaining audio signal data from a noise suppression encoder receiving an audio signal; inputting an input vector of multiple channels associated with the audio signal data into one or more grouped pointwise convolutional layers of a neural network of a noise suppression separator, wherein each grouped pointwise convolutional layer being trained to have at least two channels of the input vector share the same one or more neural network weight values; and outputting a noise suppression mask from the neural network to apply to a version of the audio signal.

By one or more second implementations, and further to the first implementation, wherein the audio signal data is frequency bin data obtained by converting the audio signal into the frequency domain by the encoder.

By one or more third implementations, and further to the first or second implementation, wherein the method comprises training the neural network to form multiple groups of the channels sharing weights, wherein individual groups are not limited to the same weights as other groups.

By one or more fourth implementations, and further to the third implementation, wherein each channel has one or more features, and wherein the features of the channels of the same individual group are consecutive features on the input vector.

By one or more fifth implementations, and further to any of the third or fourth implementation, wherein the neural network has multiple 1-D convolutional blocks, and wherein at least one pointwise convolutional layer in at least one 1-D convolutional block applies shared weights of the groups.

By one or more sixth implementations, and further to any of the fifth implementation, wherein the groups are provide on all of the 1-D blocks of the neural network.

By one or more seventh implementations, and further to any of the fifth implementation, wherein all of the pointwise convolutional layers in a 1-D block are grouped pointwise convolutional layers that use the groups.

By one or more eighth implementations, and further to any of the first to seventh implementation, wherein the groups of multiple channels sharing a same weight are weight sharing groups, and wherein the at least one processor being arranged to operate by: dividing the input vector into input groups of the channels wherein each input group comprises one or more weight sharing groups; processing the input groups at a pointwise convolutional layer of the neural network to generate separate outputs of each input group from the pointwise convolutional layer; and concatenating together the separate outputs of the input groups of the input vector.

By an example one or more ninth implementations, a computer implemented system, comprises memory; processor circuitry forming at least one processor communicatively coupled to the memory and being arranged to operate by: obtaining audio signal data from a noise suppression encoder receiving an audio signal; inputting an input vector of multiple channels associated with the audio signal data into one or more grouped pointwise convolutional layers of a neural network of a noise suppression separator, wherein each grouped pointwise convolutional layer being trained to have at least two channels of the input vector share the same one or more neural network weight values; and outputting a noise suppression mask from the neural network to apply to a version of the audio signal.

By one or more tenth implementations, and further to the ninth implementation, wherein the at least one processor is arranged to operate by grouping the channels to share weights only at a first encountered pointwise convolutional layer in a sequence of layers in at least one 1-D convolutional block of the neural network.

By one or more eleventh implementations, and further to the ninth implementation, wherein the at least one processor is arranged to operate by grouping the channels to share weights only after a depth-wise convolutional layer in a sequence of layers in at least one 1-D cony block.

By one or more twelfth implementations, and further to any of the ninth to eleventh implementation, wherein the input vector has 2 to 32 groups of channels sharing the same weights.

By one or more thirteenth implementation, and further to the ninth implementation, wherein the at least one processor is arranged to operate by performing the inputting for all pointwise convolutional layers on the network of the separator or all pointwise convolutional layers of a dynamic noise suppression network having the encoder, the separator, and a decoder.

By an example one or more fourteenth implementations, a computer-implemented dynamic noise suppression neural network comprises processor circuitry that operates a separator with a plurality of layers and arranged to receive a version of audio signal data from an encoder that receives an audio signal, the plurality of layers comprising: at least one grouped pointwise layer; a divider that receives an input vector of multiple channels associated with the audio signal data and assigns the channels to groups of two or more channels each, wherein the at least one grouped pointwise layer generates one or more separate outputs of each group; and a concatenator that concatenates together the outputs, wherein the neural network is arranged to generate a noise suppression mask to apply to a version of the audio signal.

By one or more fifteenth implementations, and further to the fourteenth implementation, wherein the divider divides the input vector into 2 to 16 input groups.

By one or more sixteenth implementations, and further to the fourteenth or fifteenth implementation, wherein the divider is provided for each pointwise convolutional layer on the network of the separator or all pointwise convolutional layers of a dynamic noise suppression network having the encoder, the separator, and a decoder.

By one or more seventeenth implementations, and further to the fourteenth or fifteenth implementation, wherein the neural network comprises at least one 1-D convolutional block with a sequence of layers comprising an output branch that provides an output of the 1-D convolutional block to a next 1-D convolutional block, and a skip-connection branch that provides an output for a skip-connection, and wherein the divider is provided on at least one of the branches.

By one or more eighteenth implementations, and further to any of the fourteenth to seventeenth implementation, wherein the at least one pointwise convolutional layer is trained to share weights in at least two weight sharing groups and between at least two channels in at least one of the groups of the input vector.

By an example one or more nineteenth implementations, at least one non-transitory computer readable medium comprising instructions thereon that when executed, cause a computing device to operate by: obtaining audio signal data from a noise suppression encoder receiving an audio signal; dividing one or more input vectors each of multiple channels associated with the audio signal data comprising assigning the channels into groups of two or more channels in each group; inputting at least one of the input vectors into one or more pointwise convolutional layers of a neural network; generating one or more separate outputs of each group from at least one of the pointwise convolutional layers; concatenating together the separate outputs; and outputting a noise suppression mask from the neural network to apply to a version of the audio signal.

By one or more twentieth implementations, and further to the nineteenth implementation, wherein the pointwise convolutional layer applies convolution filters separately to each group relative to other groups to generate the separate outputs.

By one or more twenty-first implementations, and further to the nineteenth or twentieth implementation, wherein the neural network has a plurality of 1-D convolutional blocks each with at least one pointwise convolutional layer; and wherein the instructions cause the computing device to perform the inputting for all pointwise convolutional layers in at least one of the 1-D convolutional blocks.

By one or more twenty-second implementations, and further to the nineteenth implementation, wherein the neural network has a plurality of 1-D convolutional blocks each with at least one pointwise convolutional layer; and wherein the instructions cause the computing device to perform the inputting of at least one pointwise convolutional layer of all 1-D convolutional blocks.

By one or more twenty-third implementations, and further to the nineteenth implementation, wherein the instructions cause the computing device to operate by performing the inputting on a first encountered pointwise convolutional layer of a sequence of layers of a 1-D convolutional block of the neural network.

By one or more twenty-fourth implementations, and further to the nineteenth implementation, wherein the instructions cause the computing device to operate by performing the inputting on at least one pointwise convolutional layer located after a depth-wise layer on a sequence of layers of a 1-D convolutional block of the neural network.

By one or more twenty-fifth implementations, and further to the nineteenth implementation, wherein at least one pointwise convolutional layer receiving the input vector with groups assigns convolution filters to input nodes according to group assignments of the channels to generate the separate outputs.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

The invention claimed is:

1. A computer-implemented method of audio processing, comprising:
   obtaining audio signal data from a noise suppression encoder receiving an audio signal;
   inputting an input vector of multiple channels associated with the audio signal data into one or more grouped pointwise convolutional layers of a neural network of a noise suppression separator,
   wherein each grouped pointwise convolutional layer being trained to have at least two channels of the input vector share the same one or more neural network weight values; and outputting a noise suppression mask from the neural network to apply to a version of the audio signal.

2. The method of claim 1 wherein the audio signal data is frequency bin data obtained by converting the audio signal into the frequency domain by the encoder.

3. The method of claim 1 comprising training the neural network to form multiple groups of the channels sharing weights, wherein individual groups are not limited to the same weights as other groups.

4. The method of claim 3 wherein the neural network has multiple 1-D convolutional blocks, and wherein at least one pointwise convolutional layer in at least one 1-D convolutional block applies shared weights of the groups.

5. The method of claim 4 wherein the groups are provide on all of the 1-D blocks of the neural network.

6. The method of claim 4 wherein all of the pointwise convolutional layers in a 1-D block are grouped pointwise convolutional layers that use the groups.

7. The method of claim 3 wherein each channel has one or more features, and wherein the features of the channels of the same individual group are consecutive features on the input vector.

8. The method of claim 3 wherein the groups of multiple channels sharing a same weight are weight sharing groups, and wherein the at least one processor being arranged to operate by:
dividing the input vector into input groups of the channels wherein each input group comprises one or more weight sharing groups;
processing the input groups at a pointwise convolutional layer of the neural network to generate separate outputs of each input group from the pointwise convolutional layer; and
concatenating together the separate outputs of the input groups of the input vector.

9. A computer implemented system, comprising:
memory;
processor circuitry forming at least one processor communicatively coupled to the memory and being arranged to operate by:
obtaining audio signal data from a noise suppression encoder receiving an audio signal;
inputting an input vector of multiple channels associated with the audio signal data into one or more grouped pointwise convolutional layers of a neural network of a noise suppression separator,
wherein each grouped pointwise convolutional layer being trained to have at least two channels of the input vector share the same one or more neural network weight values; and
outputting a noise suppression mask from the neural network to apply to a version of the audio signal.

10. The system of claim 9 wherein the at least one processor is arranged to operate by grouping the channels to share weights only at a first encountered pointwise convolutional layer in a sequence of layers in at least one 1-D convolutional block of the neural network.

11. The system of claim 9 wherein the at least one processor is arranged to operate by grouping the channels to share weights only after a depth-wise convolutional layer in a sequence of layers in at least one 1-D cony block.

12. The system of claim 9 wherein the input vector has 2 to 32 groups of channels sharing the same weights.

13. The system of claim 9 wherein the at least one processor is arranged to operate by performing the inputting for all pointwise convolutional layers on the network of the separator or all pointwise convolutional layers of a dynamic noise suppression network having the encoder, the separator, and a decoder.

14. A computer-implemented dynamic noise suppression neural network, comprising:
processor circuitry that operates a separator with a plurality of layers and arranged to receive a version of audio signal data from an encoder that receives an audio signal, the plurality of layers comprising:
at least one grouped pointwise layer;
a divider that receives an input vector of multiple channels associated with the audio signal data and assigns the channels to groups of two or more channels each, wherein the at least one grouped pointwise layer generates one or more separate outputs of each group; and
a concatenator that concatenates together the outputs, wherein the neural network is arranged to generate a noise suppression mask to apply to a version of the audio signal.

15. The neural network of claim 14 wherein the divider divides the input vector into 2 to 16 input groups.

16. The neural network of claim 14 wherein the divider is provided for each pointwise convolutional layer on the network of the separator or all pointwise convolutional layers of a dynamic noise suppression network having the encoder, the separator, and a decoder.

17. The neural network of claim 14 comprising at least one 1-D convolutional block with a sequence of layers comprising an output branch that provides an output of the 1-D convolutional block to a next 1-D convolutional block, and a skip-connection branch that provides an output for a skip-connection, and wherein the divider is provided on at least one of the branches.

18. The neural network of claim 14 wherein the at least one pointwise convolutional layer is trained to share weights in at least two weight sharing groups and between at least two channels in at least one of the groups of the input vector.

19. At least one non-transitory computer readable medium comprising instructions thereon that when executed, cause a computing device to operate by:
obtaining audio signal data from a noise suppression encoder receiving an audio signal;
dividing one or more input vectors each of multiple channels associated with the audio signal data comprising assigning the channels into groups of two or more channels in each group;
inputting at least one of the input vectors into one or more pointwise convolutional layers of a neural network;
generating one or more separate outputs of each group from at least one of the pointwise convolutional layers;
concatenating together the separate outputs; and
outputting a noise suppression mask from the neural network to apply to a version of the audio signal.

20. The medium of claim 19 wherein the pointwise convolutional layer applies convolution filters separately to each group relative to other groups to generate the separate outputs.

21. The medium of claim 19 wherein the neural network has a plurality of 1-D convolutional blocks each with at least one pointwise convolutional layer; and wherein the instructions cause the computing device to perform the inputting for all pointwise convolutional layers in at least one of the 1-D convolutional blocks.

22. The medium of claim 19 wherein the neural network has a plurality of 1-D convolutional blocks each with at least one pointwise convolutional layer; and wherein the instructions cause the computing device to perform the inputting of at least one pointwise convolutional layer of all 1-D convolutional blocks.

23. The medium of claim 19 wherein the instructions cause the computing device to operate by performing the inputting on a first encountered pointwise convolutional layer of a sequence of layers of a 1-D convolutional block of the neural network.

24. The medium of claim 19 wherein the instructions cause the computing device to operate by performing the inputting on at least one pointwise convolutional layer located after a depth-wise layer on a sequence of layers of a 1-D convolutional block of the neural network.

25. The medium of claim 19 wherein at least one pointwise convolutional layer receiving the input vector with groups assigns convolution filters to input nodes according to group assignments of the channels to generate the separate outputs.

* * * * *